(12) United States Patent
Nielsen et al.

(10) Patent No.: US 12,528,233 B2
(45) Date of Patent: Jan. 20, 2026

(54) CARRIER PLATE FOR A PREFORM MANUFACTURING ARRANGEMENT FOR PRODUCING A PREFORM ELEMENT FOR A WIND TURBINE BLADE, AND MOLD ARRANGEMENT FOR PRODUCING A PREFORM ELEMENT OF A WIND TURBINE BLADE

(71) Applicant: Siemens Gamesa Renewable Energy A/S, Brande (DK)

(72) Inventors: Anette Struve Nielsen, Galten (DK); Mogens Nielsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 121 days.

(21) Appl. No.: 18/289,773

(22) PCT Filed: May 10, 2022

(86) PCT No.: PCT/EP2022/062652
§ 371 (c)(1),
(2) Date: Nov. 7, 2023

(87) PCT Pub. No.: WO2022/243115
PCT Pub. Date: Nov. 24, 2022

(65) Prior Publication Data
US 2024/0278461 A1    Aug. 22, 2024

(30) Foreign Application Priority Data
May 18, 2021    (EP) .................................... 21174392

(51) Int. Cl.
B29C 33/30 (2006.01)
B29B 11/06 (2006.01)
(Continued)

(52) U.S. Cl.
CPC ............ B29C 33/307 (2013.01); B29B 11/06 (2013.01); *B29K 2105/256* (2013.01); *B29L 2031/085* (2013.01)

(58) Field of Classification Search
None
See application file for complete search history.

(56) References Cited

FOREIGN PATENT DOCUMENTS

| EP | 1603723 A1 | 12/2005 |
|---|---|---|
| EP | 2362824 A1 | 9/2011 |

(Continued)

OTHER PUBLICATIONS

F.C. Campbell: "Cure tooling: you can pay me now . . . or pay me later" In: "Cure tooling: you can pay me now . . . or pay me later", Jan. 1, 2004 (Jan. 1, 2004).

(Continued)

*Primary Examiner* — Mohammad M Ameen
(74) *Attorney, Agent, or Firm* — Schmeiser, Olsen & Watts, LLP

(57) ABSTRACT

A carrier plate for a preform manufacturing arrangement for producing a preform element for a wind turbine blade is provided, adapted to receive either a mold element with preform building material on a receiving surface or to directly receive the preform building material on the receiving surface, with the carrier plate having a rectangular shape with a longer longitudinal axis and a shorter transverse axis, wherein the carrier plate is flexible around the longitudinal axis but stiffened against bending around the transverse axis, and stretchable along the transverse axis but stiff along the longitudinal axis.

15 Claims, 8 Drawing Sheets

(51) Int. Cl.
*B29K 105/00* (2006.01)
*B29L 31/08* (2006.01)

(56) References Cited

FOREIGN PATENT DOCUMENTS

| | | |
|---|---|---|
| EP | 2661357 A1 | 11/2013 |
| EP | 2731772 A1 | 5/2014 |
| EP | 3018342 A1 | 5/2016 |
| EP | 3102396 A1 | 12/2016 |
| EP | 3 257 646 A1 * | 12/2017 |
| EP | 3 501 777 A2 | 6/2019 |
| EP | 3 715 080 A1 | 9/2020 |
| FR | 2 598 648 A1 | 11/1987 |
| WO | WO-2009/018 061 A1 * | 2/2009 |
| WO | 2013/102463 A1 | 7/2013 |
| WO | 2013/120583 A1 | 8/2013 |
| WO | 2019115337 A1 | 6/2019 |
| WO | WO-2019/115 522 A1 * | 6/2019 |
| WO | 2019145240 A1 | 8/2019 |
| WO | WO-2019/148 242 A1 * | 8/2019 |
| WO | WO-2020/173 929 A1 * | 3/2020 |

OTHER PUBLICATIONS

International Search Report for PCT/EP2022/062652 mailed on Nov. 22, 2022.

* cited by examiner

CARRIER PLATE FOR A PREFORM MANUFACTURING ARRANGEMENT FOR PRODUCING A PREFORM ELEMENT FOR A WIND TURBINE BLADE, AND MOLD ARRANGEMENT FOR PRODUCING A PREFORM ELEMENT OF A WIND TURBINE BLADE

CROSS-REFERENCE TO RELATED APPLICATIONS

This application claims priority to PCT Application No. PCT/EP2022/062652, having a filing date of May 10, 2022, which claims priority to EP Application No. 21174392.7, having a filing date of May 18, 2021, the entire contents both of which are hereby incorporated by reference.

FIELD OF TECHNOLOGY

The following refers to a carrier plate for a preform manufacturing arrangement for producing a preform element of a wind turbine blade.

BACKGROUND

As is commonly known, a wind turbine comprises among others several turbine blades attached to a hub. The blades interact with the wind making the hub rotate. To the hub a generator is coupled, which is driven by the rotating hub. The turbine blades of nowadays turbines have enormous dimensions in length and width. Their manufacturing is therefore difficult, as big parts need to be handled. One technology for producing such large blades uses preforms, which are preformed smaller blade parts used for building the respective blade shell. These prefabricated preforms are arranged and aligned according to the requested overall geometry of the blade and are finally connected respectively embedded in fiber mats and resin etc. for manufacturing the final large blade or blade part.

Each preform, which usually has a slightly bent geometry with a length of, for example 10-12 m and a width of for example 3-5 m, is prefabricated in a specific mold. The mold comprises a respective form part, in which the preform building material like fiber mats and the binding agent and, core elements, are arranged. These materials are fixated in the respective mold part by applying a vacuum, which mold part has a defined geometry corresponding to the requested blade geometry and is therefore in most cases tray-like. For this fixation, the preform building material is covered with, for example a foil, so that the vacuum can be applied to the space between the foil and the mold part, in which the building material is arranged. Afterwards, heat is applied to the building material in order to melt the locally provided binding agent for locally fixating the fiber mats and the core elements etc. by gluing them into the binder matrix provided by the molted binding agent. After this heating operation, the preform needs to be cooled down to room temperature, whereafter it is sufficiently stable to be handled by crane equipment or any other comparable handling or lifting means.

This way of producing the preforms is quite cumbersome. The molds used for producing the preforms are very complicated in their set-up, especially as a heating and cooling system needs to be provided in every mold. This makes the mold very expensive, bearing in mind that a large number of separate molds is necessary, as usually at least 20 or more preforms are needed for producing a blade or a blade part.

Further, as the respective mold geometry is designed for a respective geometry of the preform, an extensive reworking of the mold is necessary, when the preform geometry shall be changed, entailing also the adaption of the heating and cooling equipment.

Further, as both the heating and cooling treatment is performed with the preform building material respectively the hot preform being arranged in the mold, the mold is occupied. As the heating and the cooling process take a remarkable time, the entire mold is blocked during these long-lasting procedures, and the productivity is extremely low. This is even enhanced, as the mold cannot be preheated. The temperature treatment needs to start from room temperature, as all building material needs to be separately arranged in the mold before the vacuum fixation, whereafter the heating may start. Further, it is necessary to cool the hot preform down to room temperature in order to secure its stability for handling it with the lifting equipment. Further, the time during which the respective mold is occupied may even be extended, as sometimes a preform is not removed immediately after cooling it, but remains in the mold for a certain time, when no storing capacity is given.

As an alternative technique, it is possible to arrange a flexible plate-like mold element on a respective form-defining surface of a receiving section of the mold, which receiving section is for example tray-like. The thin plate-like mold element is, due to its flexibility, adapted to change its shape and adapt its shape to the geometry of the, for example tray-like, receiving section, so that the flexible plate smoothly covers this receiving section. This allows for arranging the preform building material on the plate-like mold element, where the building material may then be covered with the above-mentioned vacuum foil and be vacuum fixated. This vacuum fixation also fixates the for example tray-like geometry of the complete setup comprising the form-adapted, flexible plate-like mold element, the building material and the vacuum foil, so that a quite stiff and three-dimensionally shaped arrangement can then be handled. This plate-like mold element with the vacuum-fixated building material can then be removed from the receiving section and for example be arranged in a transport means, which transports the mold element with the building material to a separate heating means like an oven, where it is heated, and from where it is then either cooled in the ambient air or transferred to a cooling means for finally cooling it. In this case, the mold is only used for arranging the building material on the plate-like mold element, while the heating and cooling process is done elsewhere. The mold can therefore immediately be used again for preparing another preform element simply by arranging a new flexible plate-like mold element on the receiving section and arranging again new building material etc.

As mentioned, the preform building material is arranged on the plate-like mold element and vacuum-fixated. This fixation provides a stiff setup which maintains its shape. Nevertheless, it is advantageous to stabilize this arrangement for further processing.

SUMMARY

An aspect relates to an improved means for a preform manufacturing arrangement which allows for a stable handling of the fixated preform building material.

To address this aspect, embodiments of the invention propose a carrier plate for a preform manufacturing arrangement for producing a preform element for a wind turbine blade, adapted to receive either a mold element with preform building material on a receiving surface, or to directly receive the preform building material on the receiving surface, with the carrier plate having a rectangular shape with a longer longitudinal axis and a shorter transverse axis, wherein the carrier plate is flexible around the longitudinal axis but stiffened against bending around the transverse axis, and stretchable along the transverse axis but stiff along the longitudinal axis.

The inventive carrier plate, which is a one-piece plate, has a designated flexibility and stretchability, which allows for a form adaption on the one hand and for changing its dimension on the other hand. The carrier plate is flexible and therefore bendable around its longitudinal axis, which is, due to the rectangular shape, the longer axis. This flexibility respectively bendability allows for the carrier plate to for example adapt the geometry of a loaded mold element with the fixated preform building material, which for example has, due to its form adaption in the mold receiving section, a convex or tray-like form, so that the carrier plate supports the mold element with the vacuum-fixated building material perfectly over the whole contact area. The carrier plate therefore may perfectly adapt its geometry to the geometry of the mold element to be carried. This for example allows for using the carrier plate as part of the transport means, onto or into which a plate-like mold element with the vacuum-fixated building material is loaded after the vacuum fixation. The transport means for example comprises four or more of these carrier plates, each of which is adapted to receive one loaded mold element. All mold elements are perfectly supported on the respective carrier plate, so that safe transport and further processing is guaranteed.

If the carrier plate is used as part of the transport means, also the stretchability in the transverse direction is very advantageous, as it allows for changing the transverse length of the carrier plate. The mold element with the vacuum-fixated preform building material is very heavy, it has a weight of several hundred kilograms, as often only the building material weights several hundred kilograms. So, when the carrier plate is arranged in the transport means, it needs to take a very heavy load, while it also needs to ascertain that, when the mold element is loaded onto the carrier plate, no forces or loads are applied on the mold element, which would significantly change the geometry of the mold element respectively the vacuum-fixated preform building material. This is ascertained due to the stretchability in the transverse direction, which allows for the carrier plate, which is fixated to the transport means with its longitudinal sides or edges, to lengthen, when the heavy mold element is placed on the carrier plate. So, the carrier plate may for example stretch with its side regions, which follow to the longitudinal edges, along which the carrier plate is fixated to the transport means due to the weight of the mold element, while the carrier plate region, on which the mold element rests, remains in its shape. This ascertains that no remarkable forces or loads are applied from the carrier plate to the mold element, as the carrier plate is load-sensitive due to its stretchability in the transverse direction and may again adapt its geometry.

As mentioned, the carrier plate may be used as a part of the transport means and receive the loaded mold element. It may also be used as a carrier means for further carrying the loaded items through the further process steps, like the heating step or the cooling step, wherein the loaded items still remain on the carrier plate. Further, the carrier plate may also serve as a part of the mold itself. It may be directly arranged on a respective receiving section of the mold, which defines the overall shape the preform shall finally have. Due to the flexibility or elasticity of the carrier element, as it is bendable around its longitudinal axis, the carrier plate may easily follow the three-dimensional geometry respectively tray-like form of the receiving section. On this form-adapted carrier plate now either a thin plate-like mold element may be arranged, on which then the preform building material is arranged and finally vacuum-fixated. After this, the carrier plate together with the plate-like mold element with the vacuum-fixated building material is removed from the receiving section of the mold and for example transferred to the transport means, where the carrier plate is fixated at respective fixating the transport means and can change its shape, especially stretch, in order to avoid any unwanted forces or loads applied to the fixated building material, as mentioned above.

In an alternative to arranging a separate plate-like mold element on the carrier plate arranged in the receiving section, it is also possible to directly arrange the preform building material, i.e., the fiber mats, core elements and binding agent etc. on the carrier plate. In this case, the carrier plate has a double function, i.e., first the function as the building material receiving means and form-defining means, and second the function as the carrier means for carrying the finally vacuum-fixated building material through the following processes. Also, in this case, when the building material is vacuum-fixated, the carrier plate is removed from the form-defining recess of the receiving section and transferred to the transport means, where again the carrier plate engages the respective fixation elements and may again change its shape, especially stretch, in order to avoid any unwanted loads resting on the vacuum-fixated building material.

All these functions of the carrier plate are realized due to the designated flexibility and stretchability. As mentioned, the carrier plate is flexible and can bend around its longitudinal axis, while it is stiffened against a remarkable bending movement around the transverse axis. This ascertains that only some bending movement is possible around the longitudinal axis, but not rectangular to this around the transverse axis. Further, the stretchability only in the transverse direction is realized, while the carrier plate is completely stiff and in no way stretchable in the longitudinal axis.

The carrier plate, as mentioned, is a one-piece plate made either of a polymer or a metal. As a polymer any polymer may be used which shows the respective mechanical properties and which is especially heat resistant, as, as mentioned, the preform building material is heated in an oven for melting the binding agent, which is usually performed at a temperature between 60-90° C. An example of a usable polymer is polypropylene, while also other polymers may be used, while also a resin-based fiber material may be used. In an alternative, the one-piece carrier plate may also be made of metal, for example aluminum or steel or any appropriate metal alloy. In an embodiment, aluminum is used, as this is a light-weight material so that the carrier plate itself does not become too heavy. Aluminum also has a good thermal conductivity, what is advantageous when the carrier plate is arranged in a heating means like an oven for heating the building material.

Besides this, it is also possible that the flexible mold element is made of metal having a polymer coating at least on a side on which the preform building material or the mold element is received. The overall stability, although given the flexibility and stretchability, is provided by the metal plate, while the polymer coating allows for adapting the surface properties. For example, a polymer may be used, to which the molten binding agent does not stick or adhere so that the final preform may easily be removed from the carrier plate, in case that the preform is directly built on the carrier plate.

The flexible mold element itself has a thickness of 0.1-10 mm, or more desirably of 0.5-5 mm. In an embodiment, the carrier plate is as thin as possible, while certainly the requested mechanical properties are provided together with the designated flexibility and stretchability. If metal is used as the plate material, the thickness may be smaller, for example something between 0.1-1.00 mm, as the metal itself has excellent mechanical properties. If a polymer like polypropylene is used, the thickness may be larger.

As mentioned, one central feature is the stretchability of the plate in the transverse direction. In an embodiment, this stretchability is not realized based on material properties. What would be possible, if sufficiently elastic polymer material were used while with a metal plate this material inherent stretchability is not given. Instead, the inventive carrier plate is provided with its stretchability solely due to mechanical or geometric means, which are formed or shaped at the plate. The carrier plate is provided with specific geometric stretching sections formed directly at the one-piece carrier plate, which stretching sections change their geometry when a respective stretching force is applied. These stretching sections also have a spring-like character. This means that they stretch when the force is applied but relax again and retract the carrier plate to its unloaded form, when the load is no longer applied. Seen in the transverse direction, several of these stretching sections or mechanical geometries are provided so that there are designated sections or areas, where the stretching may take place, while in areas between two stretching sections no stretching is given even when the load is applied. Certainly, these stretching sections extend over the whole length of the carrier plate allowing the carrier plate to uniformly stretch and retract.

In a specific embodiment, the carrier plate is formed with one or more stretching sections having a U-shaped cross-section open to the receiving surface and extending along the longitudinal axis. These stretching sections have a specific U-shaped form which allows the neighboring plate sections to be moved apart, thereby opening the U-shaped bending section and generating a retracting spring force. The U-shape may vary in size, a larger U-shaped geometry will be more elastic than a smaller shaped one, allowing to vary the overall elasticity also by changing the U-geometry size. The adjacent plate sections are retracted again when the load is no longer applied, resulting from the retracting spring force of the formerly opened U-shaped stretching section. If several of these stretching sections are provided, which all run in parallel in the longitudinal direction, and which are for example evenly distributed seen in the transverse direction, or which are arranged with varying distances seen in the transverse direction, a remarkable stretching may be realized.

In an embodiment, the stretching sections have a horseshoe cross-section, which may also be named as a drop-like cross-section.

As mentioned, several stretching sections are provided, which are equidistantly distanced seen in the transverse direction. This embodiment ascertains a kind of homogeneous stretchability. In an alternative it is possible that the several stretching sections are arranged in at least one section with a smaller distance than in at least one other section. In this embodiment, the distance of the stretching sections in one area is smaller than the distance in another area. Therefore, the density of the stretching sections in the first area is higher than in the other area. This ascertains that the stretchability in the first area is remarkably higher than in the second area. For example, in both longitudinal side areas the density of the stretching sections may be higher, for example two or three times as high as in the center region. This ascertains that especially the edge regions are remarkably stretchable, while these regions usually are not covered with the preform building material or with the plate-like mold element loaded with the preform building material. So, a significant stretching in the edge region is realized, which is very advantageous when the carrier plate is arranged for example in the transport means, so that it may stretch in the edge regions, while the center region with the building material respectively the mold element remains its shape e.g., received due to the form adaption in the mold. Certainly, other regions than the edges of the carrier plate may show a higher elasticity, like the center or middle region or regions adjacent to the trailing or leading edge of the preform etc.

As mentioned, the or each stretching section having the U-shaped cross-section is open to the receiving surface of the carrier plate on which either the loaded mold element or the preform building material is received. In an embodiment, an elastic sealing means is provided, which at least partially fills the or each stretching section, and which is flush with the receiving surface. This sealing means guarantees for a closed receiving surface which allows for an excellent support of the loaded mold element, or especially for a closed receiving surface on which the building material may be arranged directly. The receiving surface is therefore closed, and it is avoided that any building material like the fiber mats or the like may have an unwanted form due to the open stretching sections, into which the fiber mats may be pressed when the vacuum fixation is realized. Using elastic sealing means is advantageous, as this elastic material easily follows any stretching movement, which, as mentioned, opens the U-shaped stretching sections.

In an alternative to at least partially fill the stretching sections with a flush elastic sealing means, it is possible to provide the receiving surface with an elastic sheet covering the stretching sections. In this embodiment, an elastic cover or layer is arranged on the receiving section which is sufficiently elastic so that it can follow any stretching movement, which as mentioned opens and closes the receiving sections, and on which either the mold element or the building material is arranged. Such an elastic layer or cover may be provided no matter which material is used for building the carrier plate. It may be provided on a polymer carrier plate as well as on a metal carrier plate. This elastic sheet covering may either be a rubber material or any other elastomeric polymer.

As mentioned, the carrier plate is flexible and therefore bendable around its longitudinal axis, but significantly stiffened by using respective stiffening means against any bending around the transverse axis. To realize the stiffening, one or more rod-like stiffening elements are arranged in the or each stretching section. According to this embodiment, the or each stretching section having the U-shaped cross-section is not only used as a stretching section having a spring-like characteristic, but also used as a receptacle to receive the rod-like stiffening elements. These rod-like stiffening elements are simply arranged in the U-shaped stretching sections, whereafter the stretching sections are closed either by the respective elastic sealing means or by the elastic cover as mentioned above. The rod-like stiffening elements perfectly stiffen the carrier plate against any unwanted bending, especially when a respective number of stretching sections provided with respective rod-like stiffening elements is provided.

As mentioned, the carrier plate may be used as a part of a transport means, on which the loaded mold element is arranged, or may be loaded into the transport means, when the carrier element is arranged in the mold and the preform building material is either arranged directly on the carrier plate or when a thin flexible mold plate is arranged on the carrier plate. To allow a secure fixation of the carrier plate in the transport means, fixation elements are provided at the plate sides extending along the longitudinal axis and adapted to fixate the carrier plate at a carrier device, which for example is a transport means like a rack or the like, or which is the receiving section of the mold, to which the carrier plate is fixated. So, when the carrier plate is arranged in for example the transport means, it is fixated along its longitudinal plate sides and hangs in the transport means, thereby for example stretching at the side regions.

The fixation element is realized in form of a hook-like bent plate edge. So, both longitudinal edges are hook-like bent, allowing to hang the side edges in respective receiving portions for example of the transport means or the like.

Embodiments of the invention further refer to a mold arrangement for producing a preform element of a wind turbine blade, comprising a mold carrier with a receiving section adapted to receive a transferable carrier plate as mentioned above. This mold arrangement is adapted to receive such a specific carrier plate, which is arranged in the convex or concave recess of the receiving section, so that the carrier plate follows this geometry. As mentioned above, either a flexible plate-like mold element is arranged on the carrier plate, on which mold element afterwards the building material is arranged and vacuum-fixated or the building material is directly arranged on the carrier plate. Nevertheless, in this embodiment, the carrier plate is arranged at the mold carrier, but is still transferable so that the carrier plate can be removed from the mold carrier after the building material is arranged and vacuum-fixated, however this is done.

The receiving section having the three-dimensional receiving surface, to which the carrier plate adapts its shape, may either be built by a receiving plate having a receiving receptacle with a tray-like form adapted to receive the carrier plate which adapts its form to the tray-like form by bending around its longitudinal axis. The receiving plate is interchangeable so that various receiving plates may be fixated at the mold carrier having different tray-like forms and therefore allowing to build various preform element geometries. Nevertheless, they all have a respective receiving receptacle into which the carrier plate is arranged, and which adapts to the tray-like receptacle form.

If the carrier plate is provided with respective U-shaped stretching sections, which extend to the lower or bottom-side of the carrier plate, the receiving receptacle is provided with one or more grooves, each groove being adapted to receive a stretching section of the carrier plate. This ascertains that the projecting stretching sections engage in respective grooves so that the carrier plate is in a flat support on the receiving surface.

In an alternative embodiment to using a receiving plate, it is possible that the receiving section is built by a grid comprising a number of rods extending in the longitudinal direction of the mold carrier. In this embodiment, no flat arrangement over the whole contact area is realized, but only a local contact of the lower or bottom side of the carrier plate on the grid rods is given. Nevertheless, also this embodiment ascertains a very precise support together with the respective form adaption.

In an embodiment, the cross-sectional shape of the grid may be changeable in order to change the cross-sectional shape of the carrier plate resting on the grid. So, the grid is not a form-fixated three-dimensional rod arrangement but may change its shape so that a certain change of the carrier plate geometry which is defined by the grid is possible. This arrangement therefore allows for adapting the mold itself to a new preform shape which shall afterwards be built just by changing the shape of the grid. No grid change is necessary, as the grid form itself is changeable.

This may for example be realized in that the rods are connected to several cables extending in a transverse direction of the mold carrier such that by pulling or loosening the cables the degree of the cross-sectional bending of the grid is changeable. As usually the shape of the receptacle realized by the grid is convex or tray-like, the possibility to pull or loosen the cables allows for changing the radius of the convex or tray-like receiving section. So, a simple radius adaption is possible if needed. As over the length of the grid several of these cable connections are provided, it is possible to adjust the shape and therefore the radius locally at each of these cable positions, so that it is also possible to change the radius from one grid end to the other grid end. The radius may become smaller or larger simply by pulling or loosening the respective cables. Each cable may certainly be fixated in its respective position.

If such a grid is used as the receiving section, it is possible that the grid is provided with one or more fixation elements for fixating the carrier plate. These fixation elements allow for a firm fixation of the carrier plate to the grid. In an embodiment, the or each fixation element is a gripper adapted to grip a projecting stretching section of the carrier plate. These grippers, which are for example arranged in the areas where the cables are, may be opened and closed. In the opened state the projecting stretching section engages in the gripper, while the closed gripper firmly fixates the stretching section, especially if the stretching section has a horseshoe-like cross-section. The grippers may simultaneously be controlled, for example pneumatically, so that by a respective control the overall fixation may simultaneously be realized or loosened. The grippers are also adapted to pull the carrier plate towards the grid so that they ascertain the perfect form fit in case the sole gravity is not sufficient.

Additionally, the mold arrangement is certainly provided with one or more vacuum means. At least one vacuum means is necessary in order to be able to apply a vacuum to the vacuum foil, which is either arranged on the plate-like mold element, if such a mold element is used, or which is directly applied on the carrier palate, if the building material is directly arranged on the carrier plate. Certainly, the vacuum connection may be decoupled, when the loaded plate or loaded carrier element is to be removed from the mold, while the vacuum is certainly still given for a permanent fixation. Further, a second vacuum means may be provided, if the flexible plate, which is arranged on the carrier plate, needs to be vacuum-sucked against the receiving surface provided by the carrier plate in order to ascertain a complete form adaption. In this case an evacuation of the space between the mold element and the carrier plate is necessary. To accomplish this, the mold element may be provided with sealing elements extending along its four sides and which seal towards the carrier plate. Also, this vacuum connection can be decoupled, when the carrier plate together with the mold element shall be removed from the mold and transferred to the transport device, while also here, the vacuum is still upheld.

BRIEF DESCRIPTION

Some of the embodiments will be described in detail, with reference to the following figures, wherein like designations denote like members, wherein.

DETAILED DESCRIPTION

Figure 1:
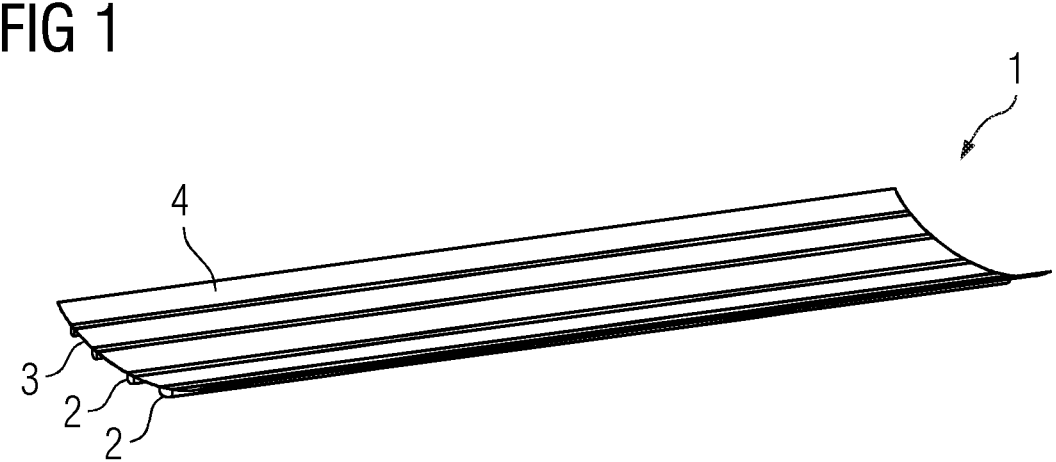
FIG. 1 is a principal prospective illustration of a carrier plate.

FIG. 1 shows a perspective principal illustration of a carrier plate 1, which is used in a preform manufacturing arrangement for producing a preform element for a wind turbine blade. This carrier plate 1 is used as a carrier means, on which a preform building material is received, either directly or arranged on a transferable flexible plate-like mold element. The carrier plate 1 will carry the building material during and through the whole manufacturing process, either starting directly in the mold, when the carrier plate is arranged on a receiving section of the mold, where the preform building material is arranged for the first time, or starting with the arrangement of the carrier plate in a transport means, where the carrier plate receives a plate-like mold element with a preform building material transferred directly from the mold on the carrier plate 1.

The carrier plate 1 is either built of a polymer, like polypropylene, or of metal, like aluminum. It is, as regards the plate itself, a one-piece plate. It is made of a single large and rectangular shaped polymer sheet or metal sheet, which is formed accordingly, in order to realize the respective geometries especially in regard of stretching sections and fixation elements, to which is referred later.

The carrier plate 1 respectively the used polymer or metal sheet has a thickness of 0.1-10 mm, or more desirably of 0.5-5 mm. It is, as mentioned, of rectangular shape, having a length of at least 10-12 m and a width of at least 3-5 m, finally depending on the size of the preform building element to be built on it or to be carried, respectively depending on the size of the intermediate flexible mold element in case the building material is arranged on the mold element. In an embodiment, the carrier plate is certainly larger to some extent, so that it extends in both longitudinal and transverse directions over the size of the preform building element respectively the plate-like mold element, for example with at least 30 cm or even more.

A central feature of the inventive carrier plate 1 is that the carrier plate is flexible around the longitudinal axis but stiffened against bending around the transverse axis. This allows for the carrier plate, as shown in FIG. 1, to change its two-dimensional flat form to a convex or tray-like form, which corresponds to the convex form of the preform building element to be finally built. This shape also corresponds to the shape of the tray-like receiving section of the mold, where the preform building material is arranged, as mentioned either directly on the carrier plate or on a flexible and transferable plate-like mold element.

Figure 2:
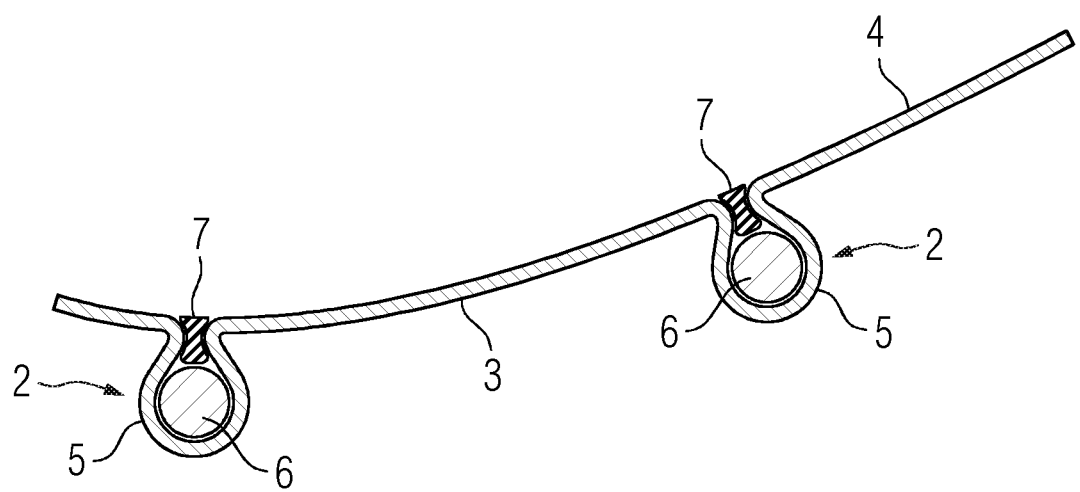
FIG. 2 is a partial illustration of the carrier plate of FIG. 1 seen in the longitudinal direction.

As mentioned, the flexibility is given around the longitudinal axis allowing for a certain bending. But any bending and therefore flexibility around the transverse axis is unwanted, as no shape or form change may occur in this direction, when the preform building material is arranged and when the carrier plate is moved through the manufacturing process. To accomplish this, the carrier plate 1 is stiffened against bending around the transverse axis. Mechanical respectively geometric stiffening means are realized, together with additional stiffening elements, which are arranged at the carrier plate. These stiffening means are realized, see for example FIG. 2, in form of a number of stretching sections 2, which project from the bottom side 3 of the carrier plate 1 as shown in FIGS. 1 and 2, while the building material respectively the flexible plate-like mold element is arranged on the upper receiving side 4 of the carrier plate 1. Each stretching section 2 has a U-shaped cross-section as clearly shown in FIG. 2, which cross-section has a horseshoe form becoming wider towards its lower end.

As these stretching sections, which, as will be explained later, act like spring elements and which allow for a stretching in the transverse direction, extend in the longitudinal direction, and as they are geometric constructions projecting from the plate surface, the stretching sections in form of the horseshoe bendings 5 also act as stiffening means preventing a bending around the transverse axis or direction. They have a double function, i.e., stretching and stiffening. For further stiffening, the carrier plate against this unwanted bending, in each horseshoe bending 5 a rod-like stiffening element 6 is arranged, as shown in FIG. 2. These stiffening elements 6 or stiffening rods enhance the stiffness. The integration of the stiffening elements 6 is easily possible due to the horseshoe bending form of the stretching sections 2.

Finally, as the stretching sections 2 respectively the horseshoe bendings 5 are open to the receiving surface 4 of the carrier plate 1, an elastic sealing means 7 is provided in each horseshoe bending 5 at least partially filling it and being flush with the receiving surface 4, so that the whole receiving surface 4 is closed. This prevents any building material from getting into one of the stretching sections 2 respectively horseshoe bendings 5.

As mentioned, the stiffening of the carrier plate 1 is already realized to an acceptable extent solely by the stretching sections 2 respectively the projecting horseshoe bendings 5. Therefore, the integration of the rod-like stiffening element 6 is optional, while desirable.

Figure 3:
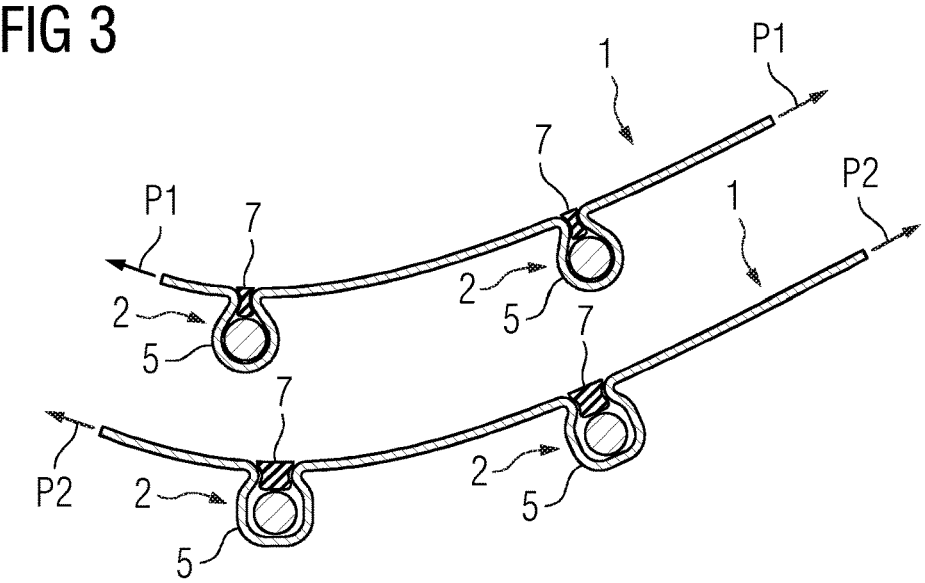
FIG. 3 is a principal illustration demonstrating the stretchability of the carrier plate.

The stretching sections 5, as mentioned, are provided to allow for a certain stretching of the carrier plate 1 in the transverse direction. FIG. 3 shows a principal sketch with a carrier plate 1 show in part. In the upper part of FIG. 3, the carrier plate 1 is shown in the unstretched basic shape, no forces pulling in the transverse direction are applied. If the carrier plate 1 is pulled in the transverse direction, as shown by the arrows P1 in FIG. 3, the stretching sections 2 respectively the horseshoe bendings 5 open, as shown in FIG. 3 in the lower part, where the carrier plate 1 is shown in a stretched position. It is obvious, that the horseshoe bendings 5 have changed their shape and became wider, also the elastic sealing means 7 is stretched. The stretching may even be enhanced, if the pulling is enhanced, as shown by the arrows P2. So, the width of the carrier plate 1 may be changed by this stretching, and also the overall shape and cross-section.

As mentioned, the stretching sections 2 respectively the horseshoe bendings act as springs. They generate a retraction force when they are stretched and opened. If the pulling force is reduced, this retracting force retracts the carrier plate again back to its original unstretched shape, the previously opened horseshoe bendings 5 close again.

Figure 4:
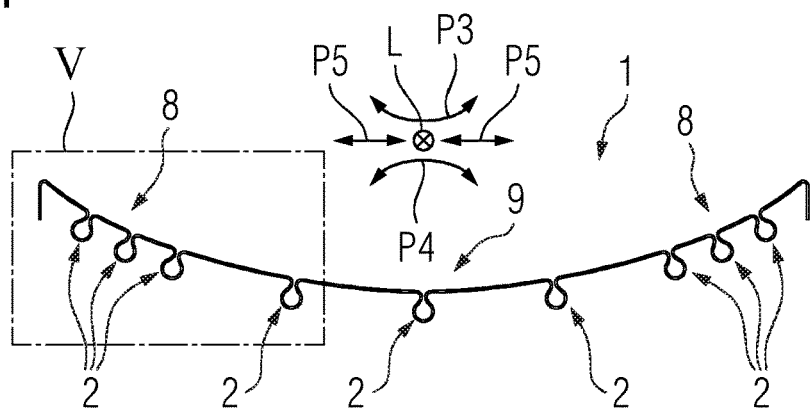
FIG. 4 is a principal illustration of the carrier plate, seen in the longitudinal direction, having a number of unevenly distributed stretching sections.

FIG. 4 shows a principal illustration of an inventive carrier plate 1 seen in the longitudinal direction. In this principal illustration, only the plate is shown with a number of stretching sections 2, which are, as FIG. 4 clearly shows, unevenly distributed along the transverse direction. The distance between two neighboring stretching sections 2 is smaller in the longitudinal edge regions 8 compared to the center region 9. This gives more flexibility in the edge regions 8 and allows for a higher stretchability in the edge regions 8, which in turn allows for an improved adaption of the radius of the convex bent carrier plate 1 as shown in FIG. 4 and FIG. 5.

FIG. 4 furthermore shows the certain bending and stretching possibilities. The longitudinal axis L is shown, around which a bending is possible in order to change the shape of the carrier plate 1 from an almost two-dimensional shape to a convex or concave shape. This is shown by the respective arrows P3 and P4. Furthermore, the stretchability in the transverse direction is shown by the arrows P5. A bending around the transverse direction is prohibited, also there is no stretching possibility in the longitudinal direction.

Figure 5:
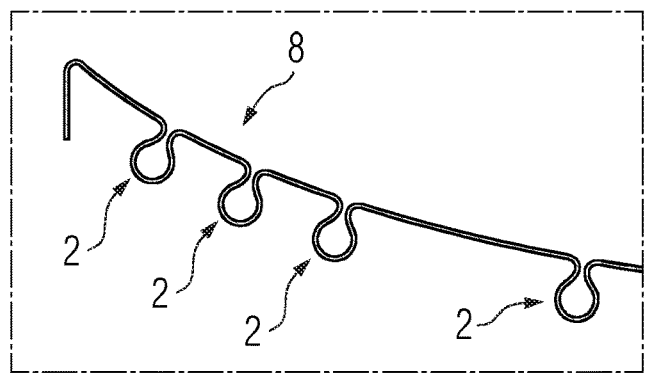
FIG. 5 is an enlarged view of the section V of FIG. 4.

FIG. 5 is an enlarged cross-section showing only an edge region 8 of the carrier plate 1. As shown in the edge region, a larger number of stretching sections 2 is provided allowing for a higher degree of stretchability and therefore flexibility in order to adapt its shape. The edge radius is clearly smaller than the radius in the center. As mentioned, in these principal illustrations of FIGS. 4 and 5 no additional stiffening elements are shown, as they are optional.

Figure 6:
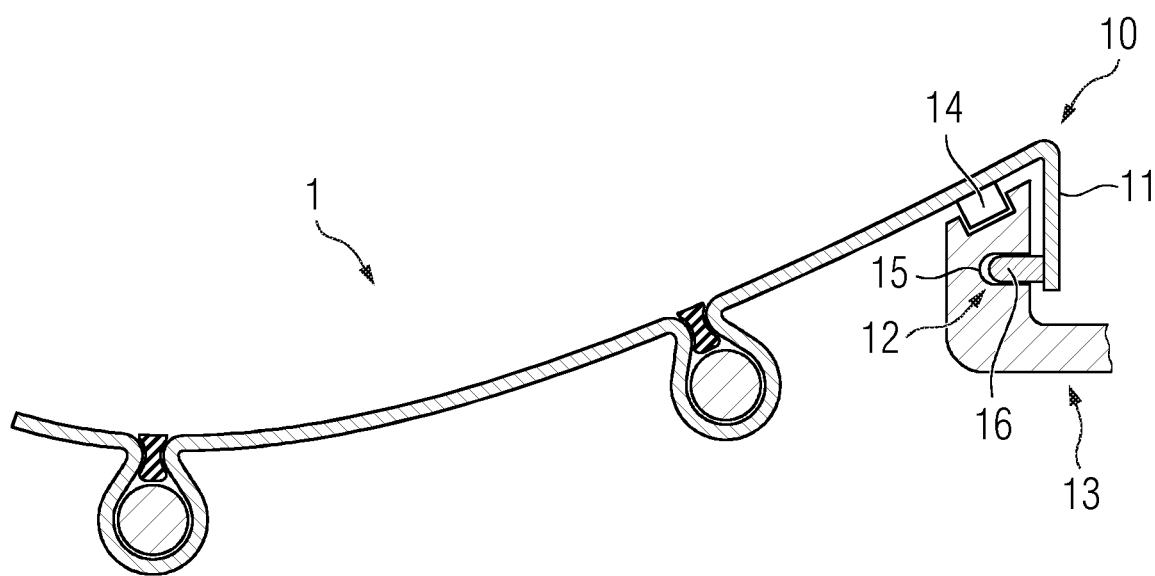
FIG. 6 is a partial illustration seen in the longitudinal direction of the edge area of a carrier plate showing a fixation element of the carrier plate arranged at the carrier means, e.g., a transport means.
Figure 7:
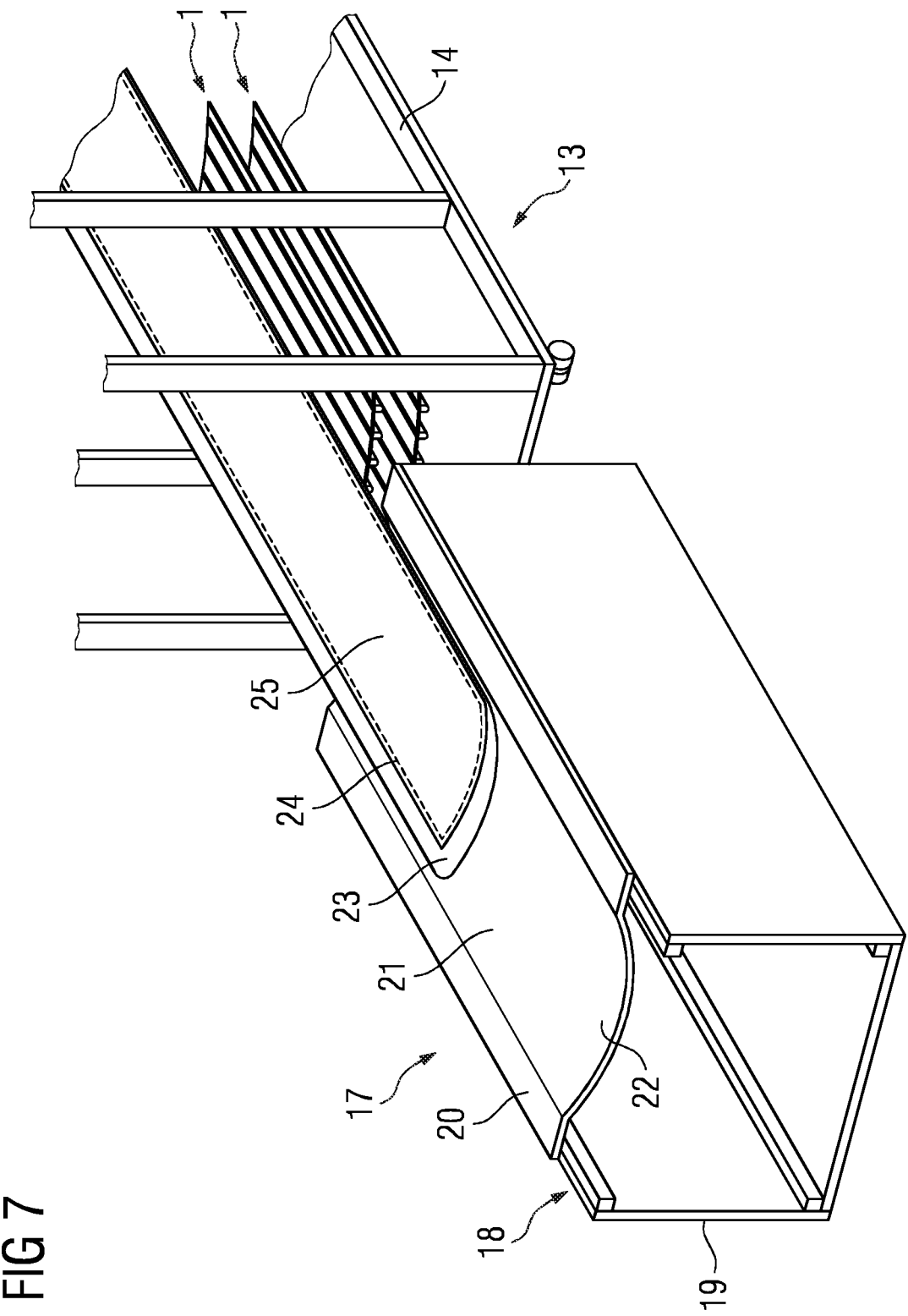
FIG. 7 is a principal illustration of a mold arrangement comprising a mold and a transport means provided with several carrier plates.

As mentioned, the carrier plate 1 is used as a carrier and transport means, which carries and transports the building material, either directly applied on the carrier plate 1 or arranged via a flexible plate-like mold element, through the whole manufacturing process. The carrier plate 1 therefore needs to be arranged and fixed for example in a transport means like a rack or, if it is separately loaded in a heating means like an oven, in respective receiving elements of the heating means etc. To accomplish this, the carrier plate 1 is provided with fixation elements 10 in the form of hook-like bent plate edges 11 as shown in FIG. 6. These hook-like fixation elements 10 extend over the whole length of each longitudinal edge of the carrier plate 1 and engage at respective receiving or hooking elements 12, for example provided at a transport means 13 like a rack as shown in FIG. 7. The hooking means 12 is for example provided with a number of roller elements 14 carrying the carrier plate 1 and allowing for an easy longitudinal pushing of the carrier plate 1 for loading and unloading the carrier plate 1. Further, a guiding groove 15 may be provided, in which a guiding pin 16 arranged at the hook-like bent plate edge 11 engages.

FIG. 7 shows a mold arrangement 17 having a mold 18 with a mold carrier 19, on which a receiving section 20 here in form of a tray-like plate is arranged. It is to be noted that the mold 18 is certainly much longer than illustrated. The mold carrier may have a length of approximately 15 m and a width of for example 6 m, the same is true for the receiving section.

The receiving section 20 has a tray-like recess 21 with a receiving surface 22, on which a flexible plate 23 made of a polymer or metal and having a thickness of for example 0.1-10 mm is arranged. Due to the flexibility of the mold element 23, which has a rectangular shape, the mold element 23 may completely adapt to the geometry of the recess 21 respectively the receiving surface 22. It therefore changes its two-dimensional form to a convex form as defined by the recess 21.

On this plate-like mold element 23 preform building material 24 is applied, as shown by the dashed lines in FIG. 7. This preform building material comprises fiber mats like glass fiber or carbon fiber mats, which are arranged in the longitudinal direction or in the transverse or chordwise direction and which overlap or overlay each other to build a respective stack. Further, in some embodiments, one or several core elements made of for example, balsa wood or of a foamed polymer may be arranged. Finally, a binding agent, a powder or a granulate, which may afterwards be melted in order to embed the fiber mats and core elements, is applied, but only locally, so that the open mat structure still remains. The binding agent is solely used to fixate the mat and core arrangement.

After applying the building material, a vacuum foil 25 is arranged covering the building material 24 and extending on the plate-like mold element 23. By a not shown vacuum pump, the space between the vacuum foil 25 and the mold element 23 is evacuated, so that the vacuum foil 25 is sucked against the building material 24 and the mold element 23 fixating and stabilizing the building material 24, while the vacuum also fixates the convex shape of the arrangement comprising the mold element 23, the building material 24 and the vacuum foil 25.

After this vacuum fixation the coupling to the vacuum pump is opened, while the vacuum is still upheld. Now, the plate-like mold element 23 is transferred to the transport means 13, where in this embodiment already two carrier plates 1 are arranged, for example by the fixation means as shown in FIG. 6. It is to be noted that the respective carrier plates 1 are movable in a vertical direction in the rack 14 in order to bring a carrier plate 1 in a respective transfer level, where the mold element 1 can be pushed on it.

To allow for this pushing movement to take place, for example a kind of air cushion may be generated at the mold 18 by a blower, which air cushion is generated underneath the mold element 23, so that the mold element 23 hovers on the air cushion and may therefore easily be pushed onto the respective carrier plate 1. The carrier plate 1 itself may be provided with a sliding coating, for example a specific sliding polymer which allows for an easy sliding transfer of the mold element 23 onto the carrier plate 1.

After the loading of the transport means 13, the transport means 13 moves for example to a heating means for heating the preform building material as a further production step, or it moves into a storage area, if the heating shall not take place immediately.

Figure 8:
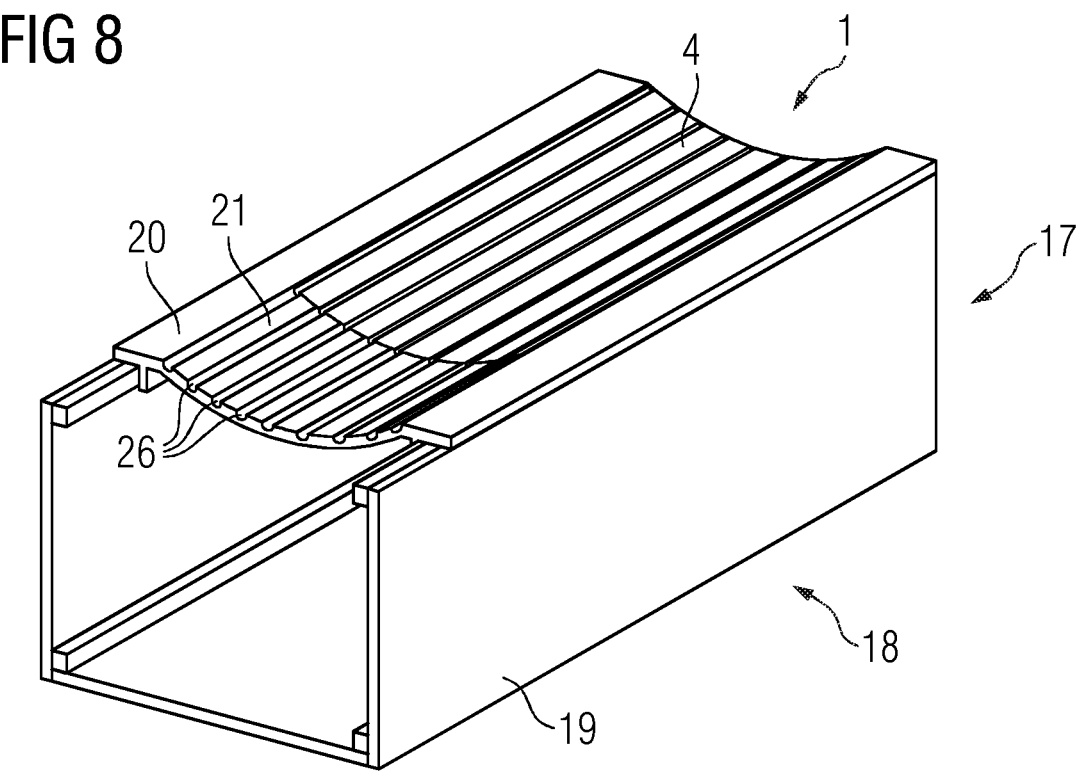
FIG. 8 is another embodiment of a mold arrangement comprising a mold and a carrier plate arranged at the mold.

FIG. 8 shows an embodiment of a mold arrangement 17 again comprising a mold 18 with a mold carrier 19 and a receiving section 20 in form of a tray-like plate. In this embodiment, the carrier plate 1 is directly placed on the receiving section and adapts its shape to the shape of the receiving surface 21 as shown. As the carrier plate 1 here is part of the mold arrangement 17, either a plate-like mold element 23 may be arranged on the carrier plate 1, on which mold element 23 the building material 24 and the vacuum foil 25 may be applied, or the building material 24 and the vacuum foil 25 are directly applied to the receiving surface 4 of the carrier plate 1. In any way, the carrier plate 1 will, after the preform building material is arranged, be transferred from the mold 18 onto the transport means 13, where the carrier plate 1 will be fixated at respective hooking elements 12 or the like, whatever fixation elements are arranged at the transport means 13.

The receiving section 22 is provided with a number of grooves 26 provided in the receiving surface 21, which number corresponds to the number of stretching sections 2 and the number of hook-like bent plate edges 11. As shown in FIG. 8, the stretching sections 2 and the bent plate edges 11 engage in the respective grooves so that the carrier plate 1 is in full flat contact with its bottom surface 3 to the receiving surface 22 and a complete form adaption is possible.

Figure 9:
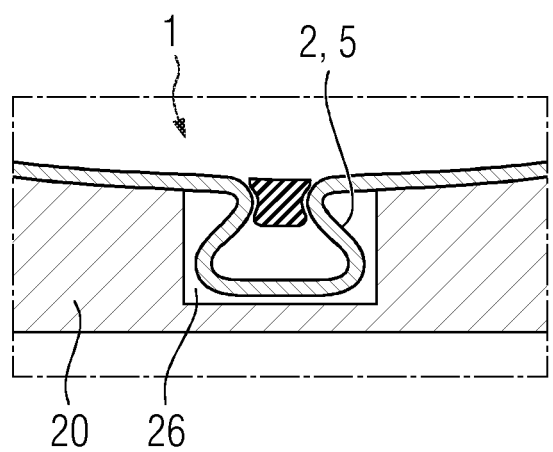
FIG. 9 is an enlarged view of the receiving section of the mold with the carrier plate arranged on it.

The engagement of the stretching section 2 respectively the horseshoe bending 5 in a respective groove 26 is shown in FIG. 9.

Figure 10:
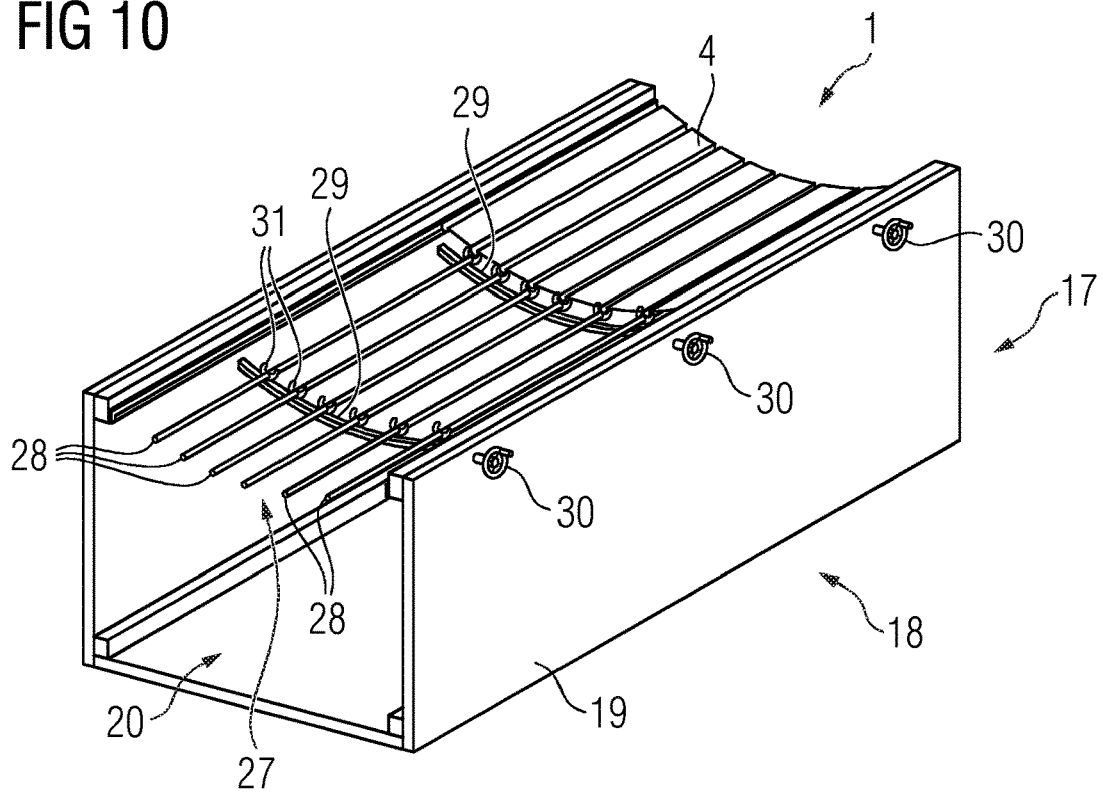
FIG. 10 is another embodiment of a mold arrangement with a receiving section in form of a grid.

FIG. 10 shows another embodiment of a mold arrangement, part of which is the inventive carrier plate 1. The mold arrangement 17 comprises a mold 18 with a mold carrier 19, which is equipped with a receiving section 20, here in form of a grid 27 comprising a number of rods 28 which extend in the longitudinal mold direction. The rods 28 are connected to several cables 29, which extend in the transverse direction and which carry the rods 28.

The cables 29 are fixed with one end to the mold carrier, while the other end extends through the mold carrier 19 to the outside. The cable ends 30 may be manually pulled out of the mold carrier 19, which allows for an adaption or changing of the radius of the receiving section respectively the grid 27. When the cables 29 are pulled out of the mold carrier 19, the grid is somehow lifted, it becomes flatter and the radius is increased. If the cables 29 are again pushed back, the grid 27 hangs in the mold carrier 19 with a smaller radius. As a certain number of separate cables 29 is provided, it is possible to locally change the form of the grid 27 and therefore the radius. This change may be homogeneous over the length of the grid, but it may also change from one end to the other, so that the radius may become smaller or larger from one end to the other.

As the carrier plate 1 is arranged on the grid 27, therefore also the radius of the carrier plate 1 and therefore of the receiving surface 4 can be changed accordingly.

Figure 11:
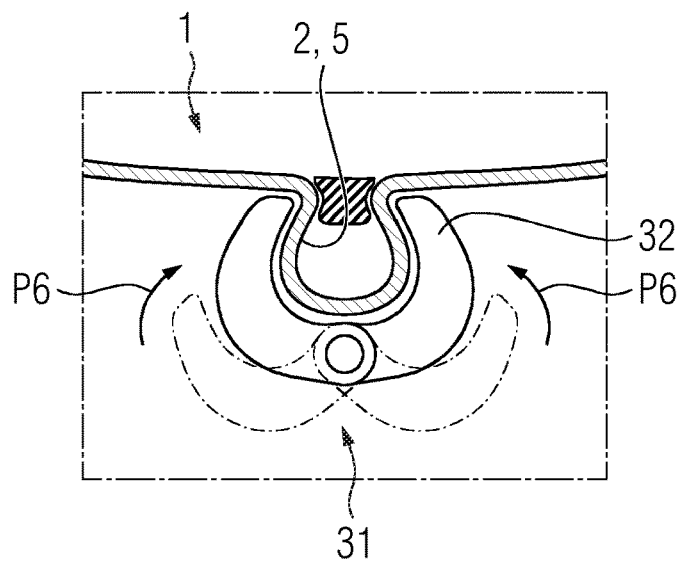
FIG. 11 is an enlarged view of the fixation element arranged at the grid for fixating the carrier plate at the grid.

To fixate the carrier plate 1, the grid 27 is provided with a number of fixation elements 31 here in form of movable pivotable grippers 32 as shown in FIG. 11. These grippers 32 may change from an open state (in FIG. 11 shown by the dashed lines) to a closed state, as shown by the arrows P6, thereby gripping the respective stretching section 2 respectively horseshoe bending 5 as shown in FIG. 11. This tightly fixates the carrier plate 1 to the grid 27 so that the carrier plate 1 will immediately follow any change of the grid geometry.

The movement of the grippers 32 may for example be simultaneously controlled by a pneumatic system or the like so that they may be simultaneously closed and opened.

In the embodiment, comparable to the embodiment of FIG. 8, the building material 24 is either directly applied on the receiving surface 4 of the carrier plate 1 together with the vacuum foil 25, or a flexible plate-like mold element 23 is arranged on the receiving surface 4 of the carrier plate 1 following the tray-like shape of the carrier plate 1, whereafter the building material 24 and the vacuum foil 25 are applied to the mold element 23. After the vacuum fixation of the building material, wherever it is applied, the fixation of the carrier plate 1 is loosened so that the carrier plate 1 may be moved onto the transport means 13, where it is fixated with respective fixation means as previously discussed.

Figure 12:
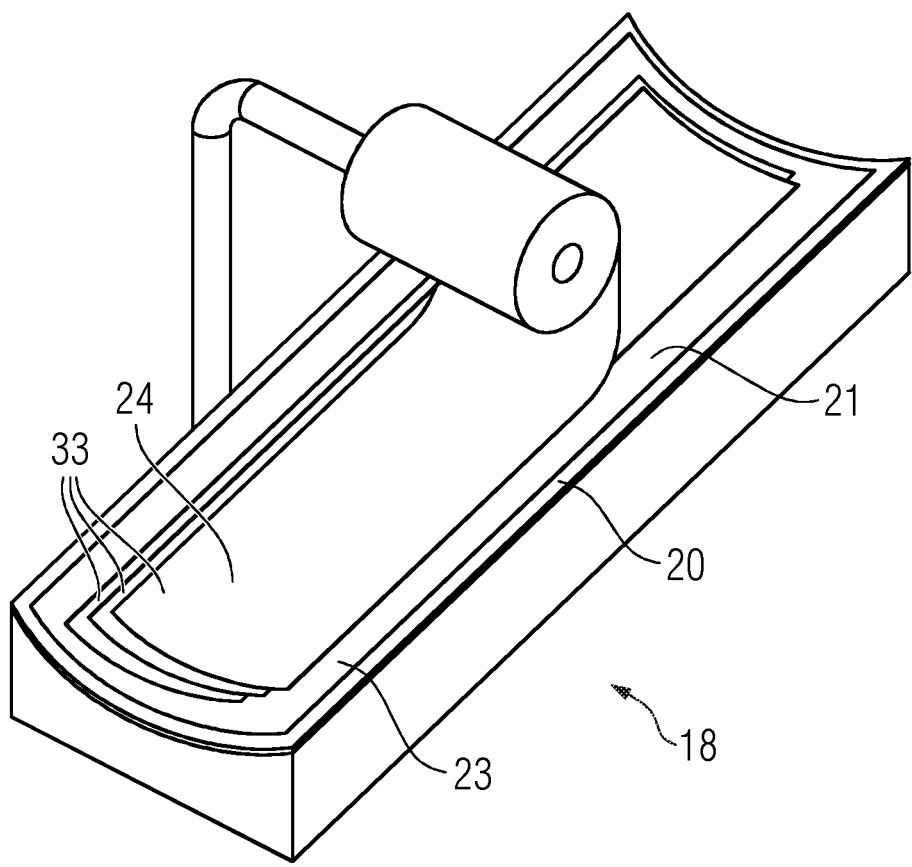
FIG. 12 is an enlarged view of a mold arrangement demonstrating the arrangement of preform building material on a transferable plate arranged on a mold.
Figure 13:
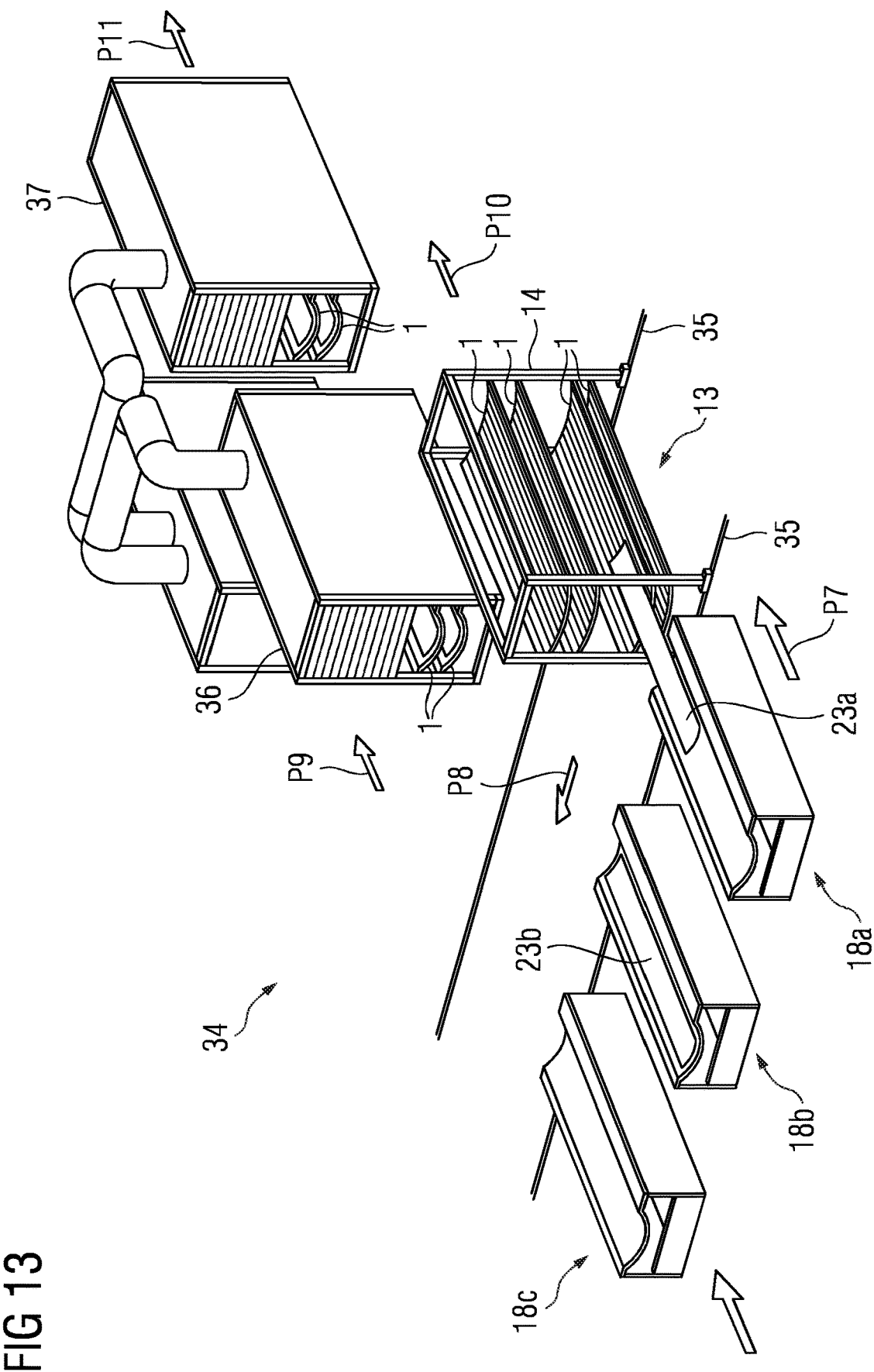
FIG. 13 is a principal illustration of a complete manufacturing arrangement comprising several molds, a transport means with several carrier plates, a heating means and a cooling means.

Finally, FIGS. 12 and 13 show an embodiment of how to manufacture a preform using an inventive carrier plate 1.

FIG. 12 shows a mold 18 with a receiving section 20, on which a flexible plate-like mold carrier 23 is arranged which has adapted its shape. On the receiving surface building material 24, here in form of layered fiber mats 33 are arranged overlapping each other and stacked above each other. They are layered in the longitudinal direction but may also be arranged chordwise or both longitudinal and chordwise. As already explained, in addition to these fiber mats 33 also optional core elements and mandatory a binding agent is applied. After this application, the vacuum foil 25 is arranged, whereafter the vacuum is applied, and the shape of the arrangement is fixated respectively frozen. Then the mold element 23 together with the binding material arrangement is ready to be transferred to the transport means.

The whole manufacturing arrangement 34 is shown in FIG. 13. A number of molds 18a, 18b and 18c are arranged side by side. On the mold 18a, as explained to FIG. 12, the mold element 23 is already provided with the building material 24 etc. and is, as shown in FIG. 13, transferred to the transport means 13 respectively the rack 14. The rack 14 is guided on rails 35 so that it can move along the molds 18a, 18b and 18c. It is equipped with a number of carrier plates 1, each of which is adapted to receive one covered mold element 23. The mold element 23a of the mold 18a is just transferred, as shown by the arrow P7. The carrier plate 1 is arranged in the respective level so that the mold element 23a can easily be pushed onto the carrier plate 1, which is for example covered with a sliding layer, while also the mold 18 is provided with a sliding means, for example an air cushion or rollers or the like.

After the mold element 23 is received in the rack 14, the rack moves to the mold 18b, as shown by the arrow P8. The mold 18b comprises the mold element 23b, which is also covered with the building material 24 and ready to be transferred to the rack 14, which is also done by a simple pushing movement.

After also a mold element, which still needs to be arranged on the mold 18c, is loaded with the building material and transferred to the rack 14, the rack 14 is positioned at the entrance of a heating means 36 like an oven, which is heated by hot air. The carrier plates 1 from the rack 14 are transferred into the oven, where a respective receiving means like holding rails or hooking arrangements or the like are provided, onto which the carrier plates 1 rest. The transfer of the carrier plates 1 from the rack 14 into the heating means 36 is shown by the arrow P9. After the heating means 36 is fully loaded, it is closed, and the heating process starts. The heating means 36 is preheated, so that it always maintains the heat and the heating can be performed quickly. During the heating the binding agent melts and embeds the building material like the mats etc. in a binder matrix. After a defined holding time, the heated mold carriers 1 are transferred to a cooling means 37 like a cooling chamber, which is also air cooled. There, the inserted carrier plates 1, which are simply pushed from the heating means 36 into the cooling means 37, will be cooled down to ambient air temperature. This transfer is shown by the arrow P10.

After the cooling is finished, the carrier plates 1 are removed from the cooling means 37, as shown by the arrow P11. They are arranged on another rack, not shown, and are either moved to the manufacturing side, where the blade or blade part is produced, or into a storage area.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A one-piece carrier plate for a preform manufacturing arrangement for producing a preform element for a wind turbine blade, configured to either receive a mold element with preform building material on a receiving surface or to directly receive the preform building material on the receiving surface, with the one-piece carrier plate having a rectangular shape with a longer longitudinal axis and a shorter transverse axis, wherein the one-piece carrier plate is flexible around the longitudinal axis but stiffened against bending around the transverse axis, and stretchable along the transverse axis but stiff along the longitudinal axis, wherein one or more geometric stretching sections allowing stretching along the transverse axis and having a spring-like character are formed at the one-piece carrier plate.

2. The one-piece carrier plate according to claim 1, wherein it is made of a polymer or metal.

3. The one-piece carrier plate according to claim 1, wherein the polymer is polypropylene and that the metal is aluminum.

4. The one-piece carrier plate according to claim 2, wherein it is made of metal having a polymer coating at least on a side on which the preform building material or the mold element is received.

5. The one-piece carrier plate according to claim 1, wherein it has a thickness of 0.1 mm to 10 mm.

6. The one-piece carrier plate according to claim 1, wherein the one or more stretching sections have a U-shaped cross section open to the receiving surface and extending along the longitudinal axis.

7. The one-piece carrier plate according to claim 6, wherein the one or more stretching sections have a horseshoe cross section.

8. The one-piece carrier plate according to claim 6, wherein several stretching sections are provided, which are equidistantly distanced seen in the transverse axis, or which are arranged in at least one section with a smaller distance than in at least one other section.

9. The one-piece carrier plate according to claim 6, wherein an elastic sealing means is provided, which at least partially fills the or each stretching section and which is flush with the receiving surface, or that the receiving surface is provided by an elastic sheet covering the stretching sections.

10. The one-piece carrier plate according to claim 6, wherein one or more rod-like stiffening elements are arranged in at least some of the or each stretching section.

11. The one-piece carrier plate according to claim 1, wherein fixation elements are provided at the plate sides extending along the longitudinal axis configured to fixate the carrier plate at a plate carrier device.

12. The one-piece carrier plate according to claim 11, wherein the fixation elements are realized in form of hook-like bent plate edges.

13. A mold arrangement for producing a preform element of a wind turbine blade, comprising:
   a mold carrier with a receiving section configured to receive a transferable one-piece carrier plate, the one-piece carrier plate having a rectangular shape with a longer longitudinal axis and a shorter transverse axis, wherein the one-piece carrier plate is flexible around the longitudinal axis but stiffened against bending around the transverse axis, and stretchable along the transverse axis but stiff along the longitudinal axis, wherein one or more geometric stretching sections allowing stretching along the transverse axis and having a spring-like character are formed at the one-piece carrier plate,
   wherein the receiving section is built by a receiving plate having a receiving receptacle with a tray-like form configured to receive the one-piece carrier plate which adapts its form to the tray-like form by bending around its longitudinal axis, wherein the receiving receptacle is provided with one or more grooves each being configured to receive a respective stretching section of the one-piece carrier plate,
   or wherein the receiving section is built by a grid comprising a number of rods extending in the longitudinal direction of the mold carrier, wherein the grid is provided with one or more fixation elements for fixating the carrier plate, wherein the one or more fixation elements include a gripper configured to grip a respective stretching section of the one-piece carrier plate.

14. The mold arrangement according to claim 13, wherein the cross-sectional shape of the grid is changeable in order to change the cross-sectional shape of the one-piece carrier plate resting on the grid.

15. The mold arrangement according to claim 14, wherein the rods are connected to several cables extending in a transvers direction of the mold carrier such that by pulling or loosening the cables the degree of the cross sectional bending of the grid is changeable.

* * * * *